United States Patent
Iijima

[11] Patent Number: 5,923,371
[45] Date of Patent: Jul. 13, 1999

[54] AUTOMATIC FOCUS ADJUSTING APPARATUS

[75] Inventor: Ryunosuke Iijima, Ebina, Japan

[73] Assignee: Canon Kabushiki Kaisha, Tokyo, Japan

[21] Appl. No.: 08/410,413

[22] Filed: Mar. 27, 1995

Related U.S. Application Data

[63] Continuation of application No. 08/132,440, Oct. 6, 1993., abandoned, which is a continuation of application No. 08/008,398, Jan. 25, 1993., abandoned, which is a continuation of application No. 07/845,221, Mar. 3, 1992., abandoned

[30] Foreign Application Priority Data

Mar. 7, 1991 [JP] Japan .................................. 3-041795

[51] Int. Cl.[6] ..................................................... H04N 5/232
[52] U.S. Cl. ............................ 348/356; 348/351; 396/79; 396/96
[58] Field of Search ..................................... 348/345, 347, 348/354, 350, 353, 252, 349, 351, 355, 356; 354/402; 396/76, 96, 77, 79, 133, 135; H04N 5/232

[56] References Cited

U.S. PATENT DOCUMENTS

| | | | |
|---|---|---|---|
| 4,484,806 | 11/1984 | Onishi et al. | 348/350 |
| 4,550,994 | 11/1985 | Maruyama | 354/402 |
| 4,841,370 | 6/1989 | Murashima et al. | 348/351 |
| 4,922,346 | 5/1990 | Hidaka et al. | 358/227 |
| 5,040,015 | 8/1991 | Hamada et al. | 354/402 |
| 5,212,516 | 5/1993 | Yamada et al. | 354/402 |
| 5,396,336 | 3/1995 | Yoshii et al. | 348/345 |
| 5,402,175 | 3/1995 | Tanaka | 348/351 |
| 5,604,538 | 2/1997 | Kaneda et al. | 348/353 |
| 5,739,858 | 4/1998 | Suda et al. | 348/355 |

*Primary Examiner*—Wendy Garber
*Assistant Examiner*—Ngoc-Yen Vu
*Attorney, Agent, or Firm*—Robin, Blecker & Daley

[57] ABSTRACT

An automatic focus adjusting apparatus comprises: a focus detecting circuit for detecting a focusing state and generating a signal according to the focusing state; a speed control circuit to switch a focus adjusting speed to a plurality of stages on the basis of an output of the focus detecting circuit; a depth detecting circuit to detect a depth of field; and a control circuit to change a threshold value of a speed switching point in the speed control circuit on the basis of an output of the depth detecting circuit.

22 Claims, 7 Drawing Sheets

AUTOMATIC FOCUS ADJUSTING APPARATUS

This is a continuation application under 37 CFR 1.62 of prior application Ser. No. 08/132,440, filed Oct. 6, 1993, which is a continuation of Ser. No. 08/008,398, filed Jan. 25, 1993, abandoned, which is a continuation of Ser. No. 07/845,221, filed Mar. 3, 1992, abandoned.

BACKGROUND OF THE INVENTION

1. Field of the Invention

The invention relates to an automatic focus adjusting apparatus suitable for use in a video camera or the like.

2. Related Background Art

In recent years, in an image pickup apparatus such as a video camera or the like, an automatic focus detecting apparatus (hereinafter, abbreviated to AF) is indispensable. However, as such a kind of AF, an attention is paid to an automatic focus detecting system for extracting a signal according to a sharpness of an object from an image pickup signal and for evaluating and for executing a focus detecting operation of an optical system.

There are various types as such a kind of AF system. A fundamental circuit construction of an AF apparatus to which the invention can be applied will be first described with reference to FIG. 1. An object image is formed by a focusing lens 1 and is formed onto the image pickup surface of an image pickup element 4 such as a CCD or the like through a zoom lens 2 and an iris 3. The object image is photoelectrically converted into a video signal by the image pickup element 4. The image pickup element 4 is periodically driven in the direction of an optical axis by an image pickup element driving circuit 28 which is driven at the timing of a reference clock generated from a timing generation circuit 7, thereby finely changing (wobbling) an image forming state. The video signal converted by the image pickup element 4 is amplified by a preamplifier 5 and is subjected to predetermined processes such as gamma correction, blanking process, addition of a sync signal, and the like by a process circuit 6 and is converted into a standardized standard video signal and is also supplied to a band pass filter (hereinafter, abbreviated to BPF) 8. The BPF 8 extracts the high frequency component which changes in accordance with the focusing state in the video signal, namely, sharpness. Subsequently, only the signal corresponding to a focal point detecting region set at a predetermined position in the screen is allowed to pass by a gate 9. The signal is rectified and the peak value is held by a peak detection circuit 10, so that a signal $S_0$ is generated. A synchronism detection circuit 11 synchronism detects the signal $S_0$ at a timing of the reference clock generated from the timing generation circuit 7 and generates a signal $S_1$ indicative of the focusing state responsive to a micro wobbling in the optical axis direction of the image pickup element 4. The output $S_0$ of the peak detection circuit 10 is delayed by 1 V (V denotes a vertical sync period) by a 1 V delay circuit 12. The delayed signal is compared with the non-delayed signal $S_0$ by a comparing circuit 13, so that a signal $S_2$ to judge whether the signal is at present climbing up or down a mountain is obtained. Further, the signal $S_0$ is also supplied to a comparator 14 for mode decision. When the value of the signal $S_0$ is larger than a threshold value $V_H$, a switch 15 is switched to the signal $S_1$ side. The signal $S_1$ responsive to the wobbling is applied to a motor driver 16, a motor 17 is driven, and the focusing lens 1 is moved, thereby performing the automatic focusing operation in the closed loop mode. On the contrary, when the value of the signal $S_0$ is equal to or smaller than $V_H$, the switch 15 is switched to the mountain climbing signal $S_2$ side and the signal is supplied to the motor driver 16. Thus, the automatic focusing operation is executed in the mountain climbing mode using no wobbling operation.

Figure 2A:
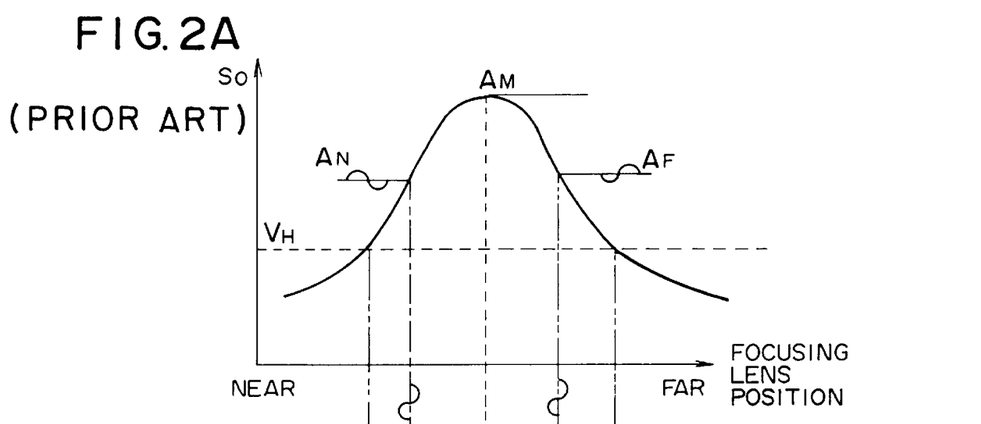
FIGS. 2A to 2C are diagrams for explaining the automatic focus detecting operation.
Figure 2B:
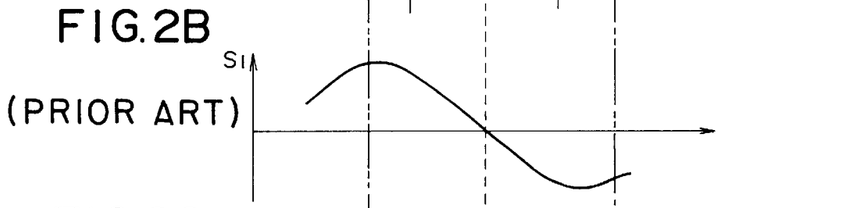
Figure 2C:
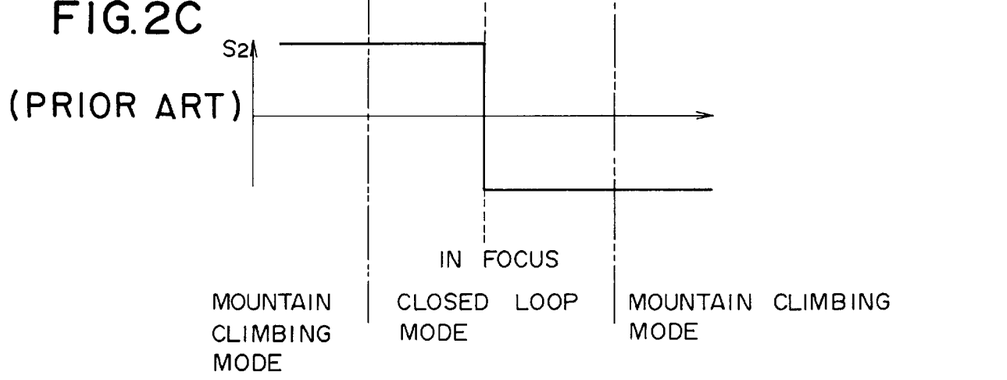

The automatic focus adjusting operation will now be further described with reference to FIGS. 2A to 2C. FIG. 2A shows the output level $S_0$ of the peak detection circuit 10 to the position of the focusing lens 1 in the in-focused/unfocused state. When the focusing lens is located on the near distance side than the in-focused point, a response signal $A_N$ to the wobbling of the image pickup element is detected. On the contrary, when the focusing lens is located on the far distance side than the in-focused point, a response signal $A_F$ to the wobbling of the image pickup element is detected. A response signal $A_M$ is detected in the in-focused state. The phase of signal when the lens is located on the near distance side is opposite to the phase of signal when the lens is contrarily located on the far distance side, front focus/rear focus information can be obtained. By sync detecting those signals at a reference timing of the output of the timing generation circuit 5, the signal $S_1$ shown in FIG. 2B is derived. That is, since the phase of the signal $A_N$ which is derived when the focusing lens is located on the near distance side is the same as the phase of the reference timing, a positive signal is generated as a sync detection output $S_1$. Since the phase of the signal $A_F$ which is obtained when the focusing lens is located on the far distance side is opposite to the phase of the reference timing, a negative signal is generated as a sync detection output $S_1$. On the other hand, the signal $S_1$ is at almost 0 level in the in-focused state. Therefore, by supplying the signal $S_1$ to the motor driving circuit 16, the motor 17 can be driven. The input signal to the motor driver in the closed loop has been described above. However, the signal $S_1$ has drawbacks. When the object image is fairly unsharp, the signal $S_0$ in FIG. 2A decreases and the output $S_1$ in FIG. 2B also decreases, so that the motor speed is reduced. Therefore, when the value of signal $S_0$ is equal to or smaller than $V_H$, the signal $S_1$ is not used but the comparison signal $S_2$ which has been compared with the 1 V preceding signal $S_0$ as shown in FIG. 2C is used. Since the signal $S_2$ is the comparison output, it is the signal having a predetermined value and only a code to drive the lens. The above operating mode is the mountain climbing mode. When the positive signal is supplied, the motor driving circuit 16 drives the motor at a speed proportional to the absolute levels of the signals $S_1$ and $S_2$ in the far distance direction from the near distance side. When the negative signal is supplied, the motor is likewise driven in the near distance direction from the far distance side. Due to this, the focusing lens is moved. Therefore, when the object image is fairly unsharp, the focusing lens is moved in the in-focusing direction at a high speed of $S_2$. When the focusing lens approaches the in-focused point, the operation to focus the object image to the in-focused point at which the signal $S_1$ is equal to 0 is performed at a speed of $S_1$, thereby executing the automatic focus adjusting operation.

In the conventional example, however, the switching between the closed loop mode using the response of the modulation signal and the mountain climbing mode which doesn't use the response of the modulation signal is executed in dependence on whether the output level of the band pass filter exceeds a predetermined value or not. Therefore, when a slope of mountain to an in-focused position of the signal indicative of an in-focused degree changes due to the position of the zoom lens or an iris value (that is, when a depth of field changes), for instance, when the focal distance is small and an angle of view is wide, the depth of field becomes deep. Therefore, a shape of mountain of a characteristic curve exhibits a gentle slope and, in the ordinary state, the operating mode is shifted from the mountain climbing mode to the closed loop mode earlier than the timing when the operating mode enters the closed loop mode and the driving speed is reduced. Consequently, there occurs a problem such that it takes a time until the object image reaches the in-focused point. On the contrary, when the focal distance is large and the angle of view is small, the depth of field contrarily becomes shallow, so that the shape of mountain exhibits a sharp slope and it becomes difficult to enter the closed loop mode just before the in-focused point. Thus, there are problems such that even when the driving speed is reduced, the object image passes the in-focused point due to a backlash of the lens driving system or the like and an overshoot occurs. In recent years, in the video camera having a zoom lens as a standard equipment, those problems are unescapable.

SUMMARY OF THE INVENTION

The invention is made to solve the above problems and it is the first object of the invention to provide an automatic focus adjusting apparatus which can always perform a focus control irrespective of a photographing situation.

The second object of the invention is to provide an automatic focus adjusting apparatus which can eliminate an overshoot near an in-focused point which can easily occur when a depth of field is shallow and inconveniences such that it takes a long time until a focusing state reaches the in-focused point when the depth of field is deep and the focusing operation becomes slow and which can always execute the good automatic focus adjusting operation.

To accomplish the above object, according to a preferred embodiment of the invention, there is disclosed an automatic focus adjusting apparatus comprising: focal point detecting means for detecting a focusing state and generating a signal according to the focusing state; speed control means for switching a focus adjusting speed to a plurality of stages on the basis of an output of the focal point detecting means; depth detecting means for detecting a depth of field; and control means for changing a threshold value of a speed change-over point in the speed control means on the basis of an output of the depth detecting means.

The above and other objects and features of the present invention will become apparent from the following detailed description and the appended claims with reference to the accompanying drawings.

DETAILED DESCRIPTION OF THE PREFERRED EMBODIMENTS

An embodiment of an automatic focus adjusting apparatus according to the invention will be described in detail hereinbelow with reference to the drawings.

Figure 1:
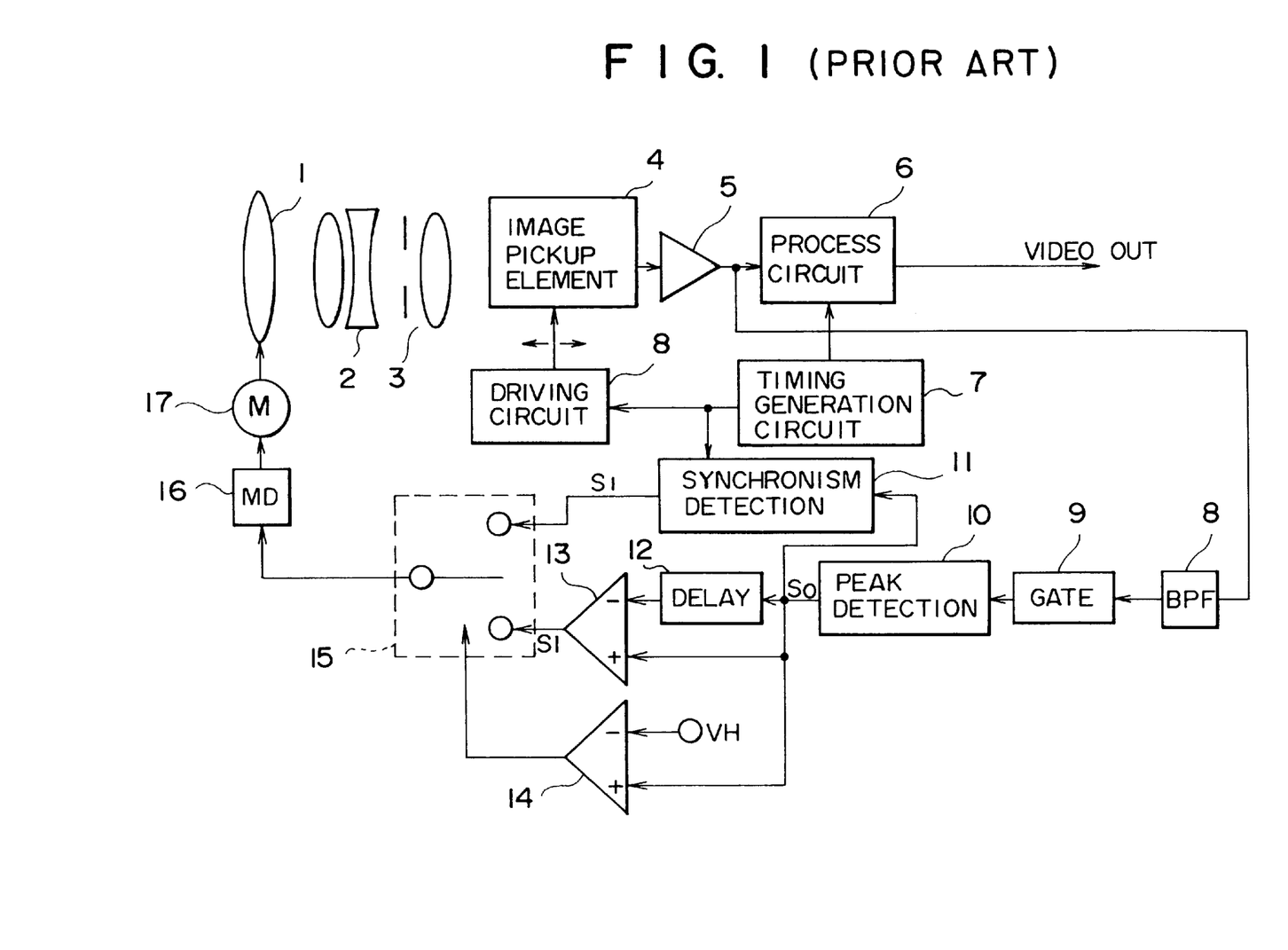
FIG. 1 is a block diagram showing an example of an automatic focus adjusting apparatus to which the invention can be applied.
Figure 3:
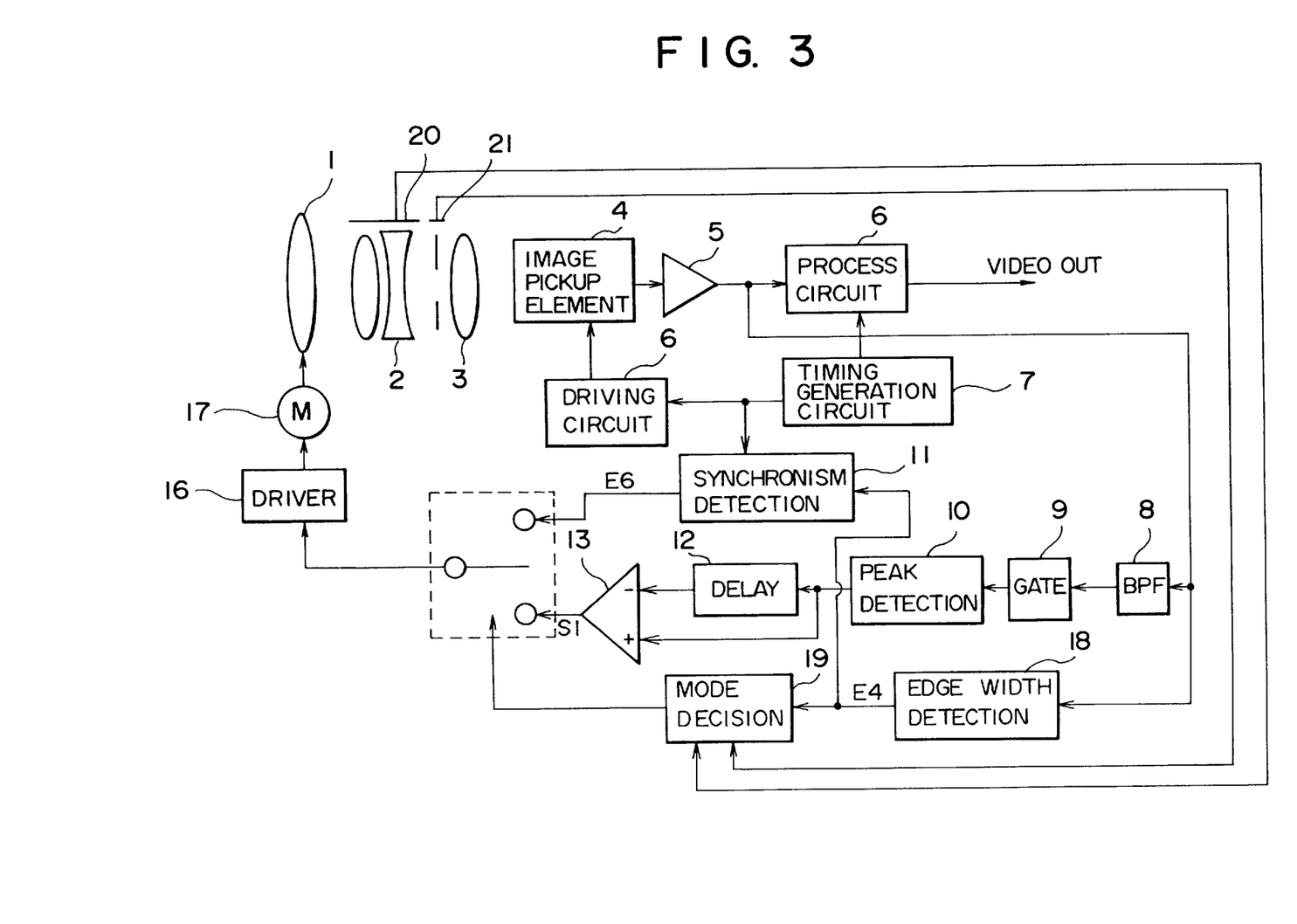
FIG. 3 is a block diagram showing an embodiment of the automatic focus adjusting apparatus according to the invention.

FIG. 3 is a block diagram showing a construction of the automatic focus adjusting apparatus according to the invention. In FIG. 3, the same component elements as those in the apparatus shown in FIG. 1 are designated by the same reference numerals and their descriptions are omitted here.

In FIG. 3, reference numeral 18 denotes an edge width detection circuit to detect information regarding an edge width of an object image which changes in accordance with a focusing state from an image pickup signal generated from the amplifier 5. Reference numeral 19 denotes a mode decision circuit for controlling the switching operation of the mode change-over switch 15 in accordance with the edge width information generated from the edge width detection circuit 18. Reference numeral 20 denotes a zoom encoder to detect a focal distance and 21 indicates an iris encoder to detect an iris value. Outputs of those encoders are supplied to the mode decision circuit 15 and used as field depth information for the switching control of the switch 15.

The automatic focus adjusting apparatus according to the invention has the above construction and the operation will now be described hereinbelow in accordance with the order.

The image pickup signal generated from the preamplifier 5 is supplied to the BPF 8, by which the high frequency component is extracted. The image pickup signal is also supplied to the edge width detection circuit 18. The edge width detection circuit detects information of an width (which is large when the object image is unsharp and which is smallest in the in-focused state) of the edge portion of the object image and generates an electric signal (edge width signal) proportional to the edge width. The edge width signal is supplied to the synchronism detection circuit 11 and a signal $E_6$ indicative of the focusing state responsive to the signal component which has been modulated by the micro wobbling in the optical axis direction of the image pickup element 4 is obtained and supplied to the mode decision circuit 19.

The mode decision circuit 19 controls the switching operation of the switch 15 according to the depth of field and the unsharpness width on the basis of the input edge width signal of the object image and the input zoom encoder signal and the input iris encoder signal. Either one of the signals $E_6$ and $S_1$ is selected and supplied to the motor driver 16, so that the automatic focus adjusting operation is performed. When the switch 15 is switched to the $E_6$ side, the focus adjustment is performed on the basis of the signal component according to the modulation component by the wobbling which has been generated from the synchronism detection circuit 11 and the focus adjustment can be executed at a high precision at a position near the in-focusing point.

When the switch 15 is switched to the $S_1$ side, the motor is driven so as to climb the mountain in such a direction that the peak value of each field of the high frequency component rises. The above driving control is mainly used in the searching operation when the object image is fairly unsharp.

Figure 4:
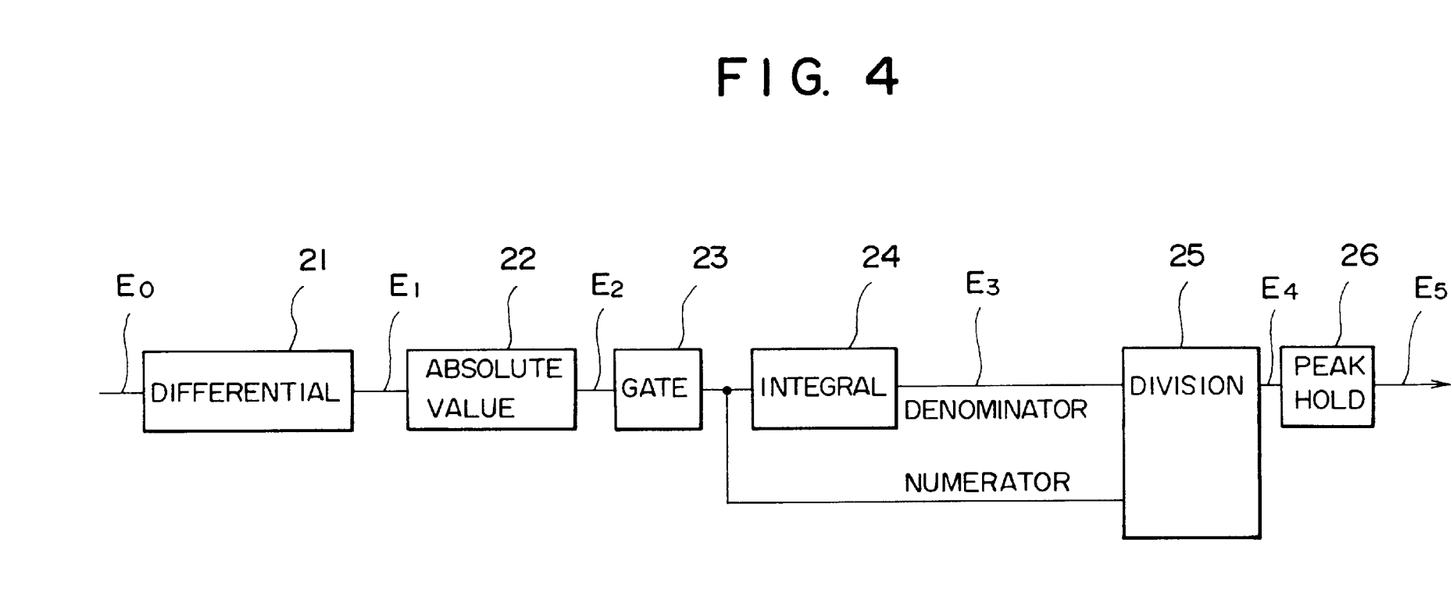
FIG. 4 is a block diagram showing a construction of an edge width detection circuit.
Figure 5:
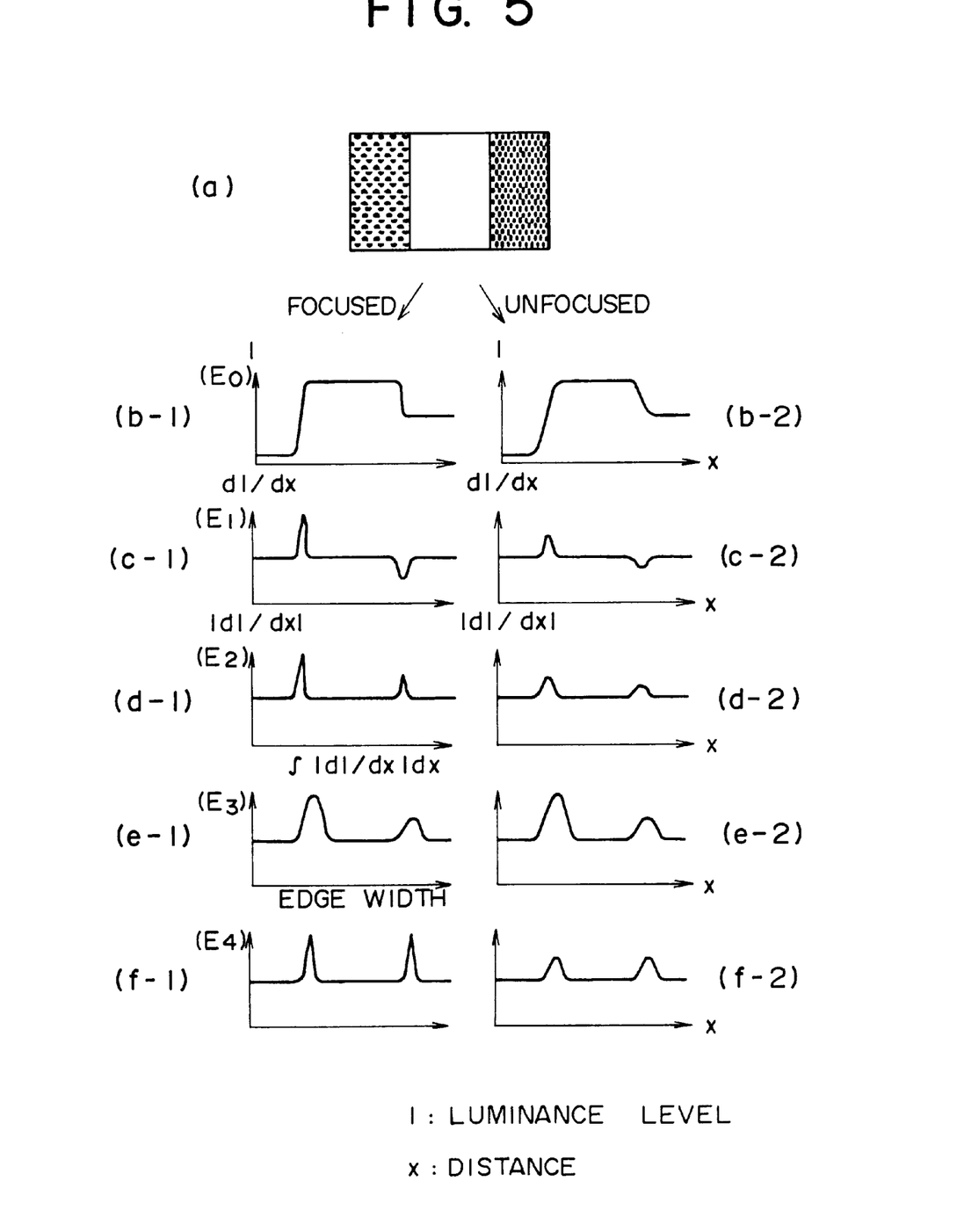
FIG. 5 is a diagram for explaining the operation of the edge width detection circuit.

The operation of the edge width detection circuit 18 will now be described with reference to FIGS. 4 and 5. FIG. 4 shows an internal construction of the edge width detection circuit 18. A signal $E_0$ supplied to the detection circuit 18 is differentiated by a differential circuit 21, so that a differentiation signal $E_1$ is generated. The absolute value of the differential signal $E_1$ is obtained by an absolute value circuit 22. Only the signal of the portion corresponding to a focus detecting region in the screen is extracted by a gate circuit 23. This signal is integrated by an integral circuit 24 by only a certain special width and supplied as a denominator to a division circuit 25. An output signal of the gate 23 is supplied as a numerator to the division circuit 25. To obtain the maximum value, on the other hand, the peak value of an output of the division circuit 25 is held by a peak hold circuit 26, so that an edge width is obtained. That is, the peak value which is obtained by dividing the peak value in an integrating period of time of the integral circuit 24 by the output of the integral circuit is held every such an integrating period of time. FIG. 5 is a diagram showing signals $E_0$ to $E_4$ with respect to the focus edge and the unfocused edge having different contrasts. (b-1) to (f-1) denote the focused edges and (b-2) to (f-2) indicate unfocused edges. As will be understood from FIG. 5, the final output $E_4$ indicates the width of edge (namely, degree of in-focusing state) irrespective of the contrast.

The operation of the apparatus will now be described with reference to FIG. 6 mainly with regard to the mode decision circuit 19.

Figure 6:
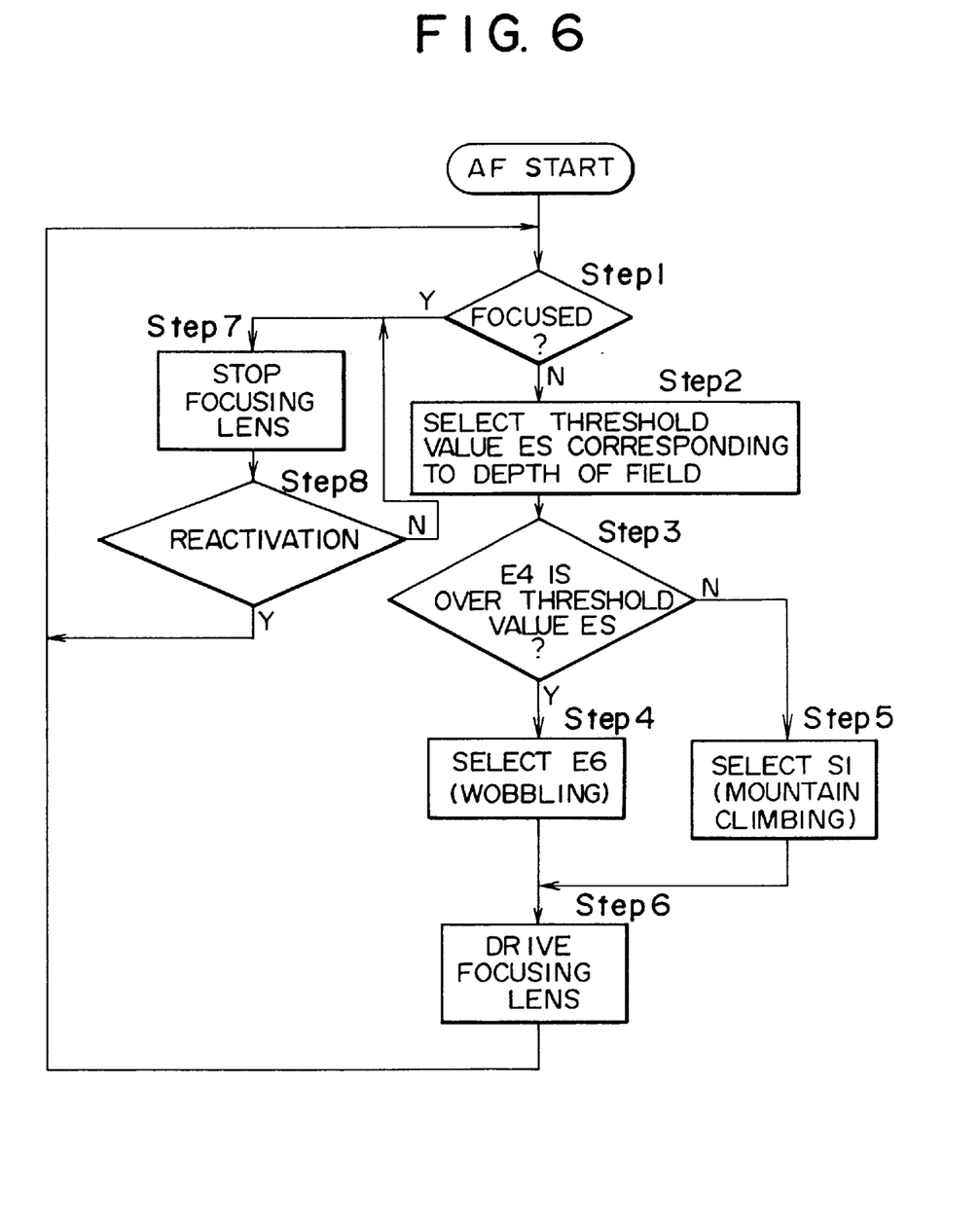
FIG. 6 is a flowchart showing the control operation of the automatic focus adjusting apparatus according to the invention.

A processing routine is started in FIG. 6. In step 1, a check is first made to see if the object image is focused or not. When it is focused, step 7 follows and the focusing lens is held in the stop state. In the next step 8, a check is made to see if the focusing lens should be reactivated or not.

When the object image is not focused in step 1, step 2 follows and the operation to select a threshold value ES to switch the signals $E_6$ and $S_1$ by the mode change-over switch 15 according to the depth of field is executed.

In step 3, a check is made in the edge width detection circuit shown in FIG. 4 to see if the edge width detection value $E_4$ exceeds the threshold value ES or not. When it exceeds ES, namely, when the focusing state is near the in-focused point, step 4 follows and the signal $E_6$ is selected. The processing routine advances to step 6 and the focus adjusting operation by wobbling is executed.

When the edge width detection value $E_4$ is equal to or less than the threshold value ES in step 3, step 5 follows and the signal $S_1$ is selected. The processing routine advances to step 6 and the focus adjustment by wobbling is not used but the focus adjusting operation by the mountain climbing control by the peak value of the high frequency component is executed. It is an important point in the flowchart that the threshold value ES to switch the mode change-over switch 15 changes in accordance with the depth of field.

Figure 7A:
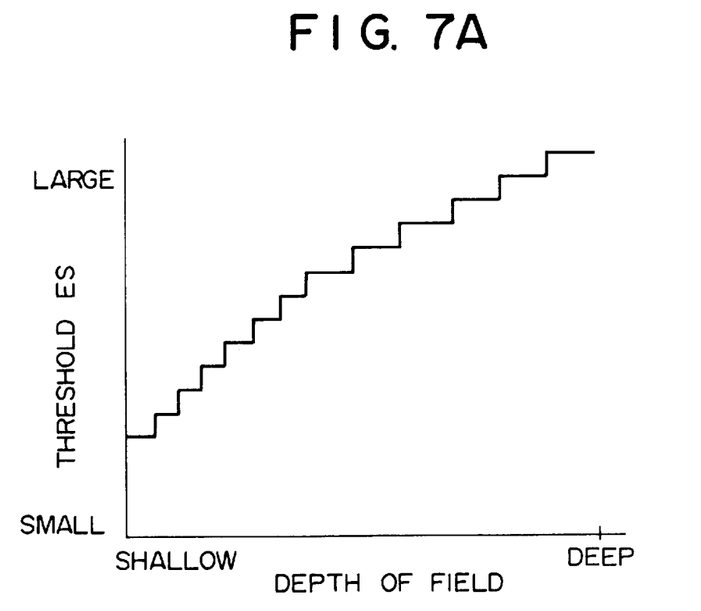
FIGS. 7A to 7C are diagrams for explaining the operation to make a threshold value for mode switching variable in accordance with a depth of field.
Figure 7B:
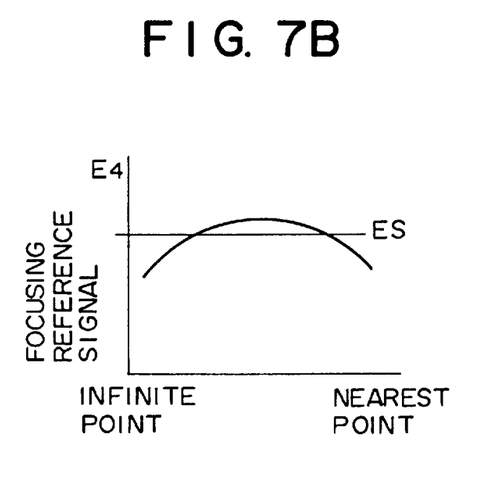
Figure 7C:
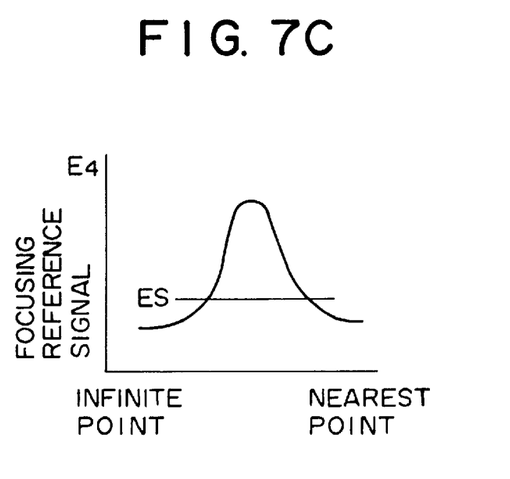

FIGS. 7A to 7C are graphs showing selecting states of the threshold value ES according to the depth of field. In FIGS. 7A to 7C, an axis of abscissa indicates the depth of field and an axis of ordinate indicates the threshold value ES to determine the switching point of the signals $S_1$ and $E_6$. FIG. 7A shows a state in which the threshold value ES changes step by step in accordance with the depth of field. The depth of field is calculated by using the zoom encoder 20 and iris encoder 21. When the depth of field is deep, a change curve of the focusing reference signal $E_4$ indicative of a focusing degree according to the movement of the focusing lens draws a mountain of a gentle curve (FIG. 7A), so that the in-focused point doesn't sharply appear. Therefore, the change-over threshold value ES is set to a slightly high value, thereby allowing the driving signal $S_1$ to be generated up to a position near the in-focused point and thereby reducing the time which is required from the large unsharp state to the in-focused state. When the depth is shallow, on the contrary, since the focusing reference signal $E_4$ draws a steep mountain (FIG. 7B), the change-over threshold value ES is set to a slightly low value, thereby preventing that the object image passes the in-focused point due to a backlash of a helicoid or the like and that an overshoot occurs.

As mentioned above, the depth is calculated by using the information of the zoom encoder and iris encoder. When the depth is deep, the change-over threshold value ES is set to a slightly high value. When the depth is shallow, the change-over threshold value ES is set to a slightly low value. The switching point between the closed loop mode and the mountain climbing mode is made variable depending on the depth. Due to this, the focusing time which is required from the large unsharp state to the in-focused point can be set to an almost constant value independently of the depth. On the other hand, even when the focal distance is extremely long as in the case of telescope or the like and the depth is particularly shallow, by reducing the threshold value, it is possible to eliminate an inconvenience such that when the operating mode is shifted from the mountain climbing mode to the closed loop mode, the object image exceeds the in-focused point and an overshoot occurs or the like because the change-over point is located just before the in-focused point.

In FIGS. 7A to 7C, the axis of abscissa indicates the depth of field as a function of the zoom and iris. However, in the case where an angle of view changes in dependence on the focal distance, not only the mountain shape but also the edge width signal delicately changes. Therefore, the threshold value ES is not merely changed on the basis of only the depth of field but can be set in consideration of the angle of view as well. In the automatic focusing system for executing the automatic focusing adjustment using the video signal, the realization of a high magnification zoom lens or a telescope zoom is at present accomplished. Therefore, by using the invention, an automatic focusing system of a higher response speed and a higher accuracy can be realized. The always stable focus adjusting operation can be performed in any photographing state.

According to the automatic focus adjusting apparatus of the invention as mentioned above, by making the threshold value ES to shift the operating mode from the mountain climbing mode to the closed loop mode variable in accordance with the depth of field, the focusing operation can be performed in accordance with the mountain shape of the focusing reference signal. It is possible to prevent an inconvenience such that when the depth is deep, the focusing time increases and when the depth is shallow, the object image passes the in-focused point and an overshoot occurs as in the case of the conventional system in which the change-over threshold value is constant. A stable automatic focus adjusting apparatus having a high precision which can always uniform the focusing performance irrespective of the depth of field can be realized.

What is claimed is:

1. An automatic focus adjusting apparatus, comprising:
   (A) focus detection means for outputting a focus signal which varies according to a focusing state;
   (B) focus adjusting means being capable of setting a first focus adjusting mode in which a focus lens is driven with a high speed in the direction of increasing of the level of said focus signal, and a second focus adjusting mode, different from said first focus adjusting mode in focus adjusting algorithm, in which a focal point is detected by wobbling said focus lens with a predetermined period in the direction of an optical axis;

(C) switching means for comparing the level of said focus signal outputted from said focus detection means with a predetermined threshold value and for switching between said first focus adjusting mode and said second focus adjusting mode according to the result of the comparison during the drive of said focus lens toward an in-focus position and until said focus lens reaches said in-focus position; and (D) control means for controlling a timing of a switching operation of said switching means by changing said predetermined threshold value on the basis of a depth of field.

2. An apparatus according to claim 1, wherein said first focus adjusting mode is a mode in which said focus lens is hill-climbing controlled.

3. An apparatus according to claim 2, wherein said focus detection means output a high frequency component of a video signal as the focus signal representing the focusing state, and wherein said first focus adjusting mode hill-climbing controls said focus lens in the direction of increasing of the level of said high frequency component.

4. An apparatus according to claim 1, wherein said second focus adjusting mode is a mode in which said focus lens is wobbled with said predetermined period and front-focus, rear-focus and in-focus are discriminated according to phase of changing of the level of said focus signal corresponding to the wobbling.

5. An apparatus according to claim 4, wherein said focus detection means outputs an edge component of a video signal as the focus signal representing the focusing state, and wherein said second focus adjusting mode discriminates the focal point on the basis of phase of changing of the level of said edge component corresponding to the wobbling of said focus lens.

6. An apparatus according to claim 1, wherein said control means operates the depth of field from a focal distance and an iris value.

7. An apparatus according to claim 1, wherein said control means increases said predetermined threshold value when the depth of field is large and reduces said predetermined threshold value when the depth of field is small.

8. An apparatus according to claim 1, wherein said focus detection means uses a high frequency component of a video signal and an edge component of an object image as the focus signal, and wherein said switching means switches between the modes by comparing said predetermined threshold value and said edge component.

9. An automatic focus adjusting apparatus, comprising:

(A) image pick-up means for outputting an image pick-up signal;

(B) focus detection means for outputting a focus signal which varies according to a focusing state, from said image pick-up signal;

(C) focus adjusting means being capable of setting a first focus adjusting mode in which a focus lens is controlled with an open loop in the direction of increasing of the level of the focus signal and a second focus adjusting mode different from said first focus adjusting mode in focus adjusting algorithm, in which said focus lens is controlled with a closed loop;

(D) switching means for comparing the level of said focus signal outputted from said focus detection means with a predetermined threshold value and for switching between said first focus adjusting mode and said second focus adjusting mode according to the result of the comparison during the drive of said focus lens toward an in-focus position and until said focus lens reaches said in-focus position; and (E) control means for controlling a timing of a switching operation of said switching means switching between said first focus adjusting mode and said second focus adjusting mode by changing said predetermined threshold value on the basis of a depth of field.

10. An apparatus according to claim 9, wherein said first focus adjusting mode is a mode in which said focus lens is hill-climbing controlled in the direction of increasing of the level of said focus signal.

11. An apparatus according to claim 10, wherein said focus signal is a high frequency component of said image pick-up signal.

12. An apparatus according to claim 9, wherein said second focus adjusting mode is a mode in which said focus lens is wobbled with a predetermined period in the direction of an optical axis and front focus, rear focus and in focus are discriminated according to phase of changing of the level of said focus signal corresponding to the wobbling.

13. An apparatus according to claim 12, wherein said focus signal is an edge component of said image pick-up signal.

14. An apparatus according to claim 9, wherein said control means operates the depth of field from a focal distance and an iris value.

15. An apparatus according to claim 14, wherein said control means increases said predetermined threshold value when the depth of field is large and reduces said predetermined threshold value when the depth of field is small.

16. An apparatus according to claim 9, wherein said focus detection means uses a high frequency component of said image pick-up signal and an edge component of an object image as said focus signal, and wherein said switching means switches between the modes by comparing said predetermined threshold value and said edge component.

17. A video camera, comprising:

(A) an image pickup lens including a focus lens and a zoom lens;

(B) image pick-up means for outputting an image pick-up signal by photoelectrically converting an object image focused by said image pick-up lens;

(C) focus detection means for outputting a first focus signal having a sharp characteristic which varies according to a focusing state, and a second focus signal having a broad characteristic; and (D) switching control means for controlling a switching operation based on an output of said focus detection means between a first focus adjusting mode in which said focus lens is driven with a high speed on the basis of said first focus signal and a second focus adjusting mode different from said first focus adjusting mode in focus adjusting algorithm, in which said focus lens is driven with a low speed on the basis of said second focus signal and for controlling a timing of said switching operation, according to information of depth of fields during the drive of said focus lens.

18. A video camera according to claim 17, wherein said first focus signal is a high frequency component of said image pick-up signal.

19. A video camera according to claim 18, wherein said first focus adjusting mode is a mode in which said focus lens is hill-climbing controlled in the direction of increasing of the level of said high frequency component.

20. A video camera according to claim 17, wherein said second focus signal is an edge component of said image pick-up signal.

21. A video camera according to claim 20, wherein said second focus adjusting mode is a mode in which said focus lens is wobbled with a predetermined period in the direction of an optical axis and front-focus, rear-focus and in-focus are discriminated according to phase of changing of the level of said edge component corresponding to the wobbling.

22. A video camera according to claim 20, wherein said control means switches between said first focus adjusting mode and said second focus adjusting mode on the basis of a result of comparison of the level of said edge component and a predetermined threshold value and changes said predetermined threshold value according to the depth of field.

* * * * *

UNITED STATES PATENT AND TRADEMARK OFFICE
CERTIFICATE OF CORRECTION

PATENT NO. : 5,923,371
DATED : July 13, 1999
INVENTOR(S) : Ryunosuke Iijima

It is certified that error appears in the above-identified patent and that said Letters Patent is hereby corrected as shown below:

Col. 1, line 19, delete "However, as such a kind of AF, an" and insert -- However, as such kind of AF --.

Col. 1, line 24, delete "types as such a kind" and insert -- types of such kind --.

Signed and Sealed this

Twenty-eighth Day of November, 2000

Attest:

Q. TODD DICKINSON

*Attesting Officer*          *Director of Patents and Trademarks*